(12) United States Patent
Tomeo et al.

(10) Patent No.: US 9,682,450 B2
(45) Date of Patent: Jun. 20, 2017

(54) GAS TURBINE ENGINE NOSE CONE ATTACHMENT CONFIGURATION

(71) Applicant: United Technologies Corporation, Hartford, CT (US)

(72) Inventors: Peter V. Tomeo, Middletown, CT (US); Carney R. Anderson, East Haddam, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1198 days.

(21) Appl. No.: 13/739,294

(22) Filed: Jan. 11, 2013

(65) Prior Publication Data

US 2014/0199176 A1    Jul. 17, 2014

(51) Int. Cl.
| | | |
|---|---|---|
| *F01D 5/02* | (2006.01) |
| *B23P 15/04* | (2006.01) |
| *F01D 5/28* | (2006.01) |
| *F02C 7/04* | (2006.01) |
| *F01D 11/00* | (2006.01) |

(52) U.S. Cl.
CPC .............. *B23P 15/04* (2013.01); *F01D 5/025* (2013.01); *F01D 5/282* (2013.01); *F02C 7/04* (2013.01); *F01D 11/008* (2013.01); *F05D 2220/3216* (2013.01); *F05D 2220/36* (2013.01); *Y02T 50/672* (2013.01); *Y02T 50/673* (2013.01); *Y10T 29/49327* (2015.01)

(58) Field of Classification Search
CPC ........ F01D 11/005; F01D 11/008; F02C 7/04; F02C 7/042; F02C 7/047; F05D 2220/3216; F05D 2220/36; Y10T 29/49321; Y10T 29/49323; Y10T 29/49327

See application file for complete search history.

(56) References Cited

U.S. PATENT DOCUMENTS

| | | | | |
|---|---|---|---|---|
| 1,773,319 | A | * | 8/1930 | Rauen ..................... B64C 11/14 416/245 R |
| 2,297,226 | A | * | 9/1942 | Muller-Keuth ......... B64C 11/14 416/245 R |
| 2,371,801 | A | * | 3/1945 | Chester ................... B64C 11/14 220/327 |
| 2,394,749 | A | * | 2/1946 | Chester ................... B64C 11/14 285/189 |
| 2,927,725 | A | * | 3/1960 | Rainbow ............... F01D 17/162 415/115 |
| 3,799,693 | A | | 3/1974 | Hull |
| 3,990,814 | A | | 11/1976 | Leone |

(Continued)

*Primary Examiner* — Gregory Anderson
*Assistant Examiner* — Wayne A Lambert
(74) *Attorney, Agent, or Firm* — Carlson, Gaskey & Olds, P.C.

(57) ABSTRACT

A gas turbine engine fan section includes a fan hub configured to rotate about an axis. A nose cone includes a spinner operatively mounted to the fan hub. The spinner supports a first fastening element and the nose cone includes an annular cover arranged over the fastening element. The spinner and annular cover provide an aerodynamic exterior surface of the nose cone without exposed fasteners. A second fastening element cooperates with the first fastening element to secure the spinner relative to the fan hub. The first and second fastening elements are oriented transversely to the axis.

20 Claims, 3 Drawing Sheets

(56) References Cited

U.S. PATENT DOCUMENTS

| | | | | |
|---|---|---|---|---|
| 4,393,650 | A * | 7/1983 | Pool | F02C 7/047 416/132 R |
| 4,738,416 | A * | 4/1988 | Birbragher | B64D 15/04 244/134 B |
| 4,783,026 | A * | 11/1988 | Rumford | B64D 15/04 244/134 B |
| 4,863,354 | A * | 9/1989 | Asselin | B64C 11/14 415/175 |
| 4,941,317 | A * | 7/1990 | Ivey | F01D 5/085 416/95 |
| 5,466,125 | A * | 11/1995 | Knott | F01D 11/008 416/193 A |
| 5,573,378 | A | 11/1996 | Barcza | |
| 5,833,435 | A * | 11/1998 | Smith | F02C 7/04 156/153 |
| 6,416,280 | B1 | 7/2002 | Forrester et al. | |
| 6,447,255 | B1 | 9/2002 | Bagnall et al. | |
| 6,561,763 | B2 * | 5/2003 | Breakwell | F02C 7/04 416/245 R |
| 6,942,462 | B2 * | 9/2005 | Breakwell | B64C 11/14 416/245 R |
| 8,092,183 | B2 * | 1/2012 | Borzakian | F01D 5/027 416/219 R |
| 8,292,592 | B2 * | 10/2012 | Welch | F02C 7/04 415/201 |
| 8,322,991 | B2 * | 12/2012 | MacFarlane | F01D 5/027 416/144 |
| 2008/0279688 | A1 * | 11/2008 | Jensen | F01D 5/08 416/95 |
| 2009/0214354 | A1 | 8/2009 | Bagnall | |
| 2010/0226786 | A1 | 9/2010 | Mahan | |
| 2010/0258199 | A1 * | 10/2010 | Schreiber | F02C 7/04 137/15.1 |
| 2010/0322772 | A1 * | 12/2010 | Hoyland | F01D 5/22 416/193 A |
| 2011/0085914 | A1 * | 4/2011 | Breakwell | F01D 11/008 416/248 |
| 2011/0146299 | A1 * | 6/2011 | Hoyland | F01D 11/006 60/797 |
| 2011/0223008 | A1 * | 9/2011 | Belmonte | F01D 5/027 415/119 |
| 2012/0134843 | A1 * | 5/2012 | Bottome | F01D 5/066 416/245 R |
| 2012/0134844 | A1 * | 5/2012 | Bottome | F02C 7/04 416/245 R |
| 2013/0255277 | A1 * | 10/2013 | Macchia | F02C 7/04 60/805 |
| 2014/0255202 | A1 * | 9/2014 | Kling | F02C 7/05 416/245 R |

\* cited by examiner

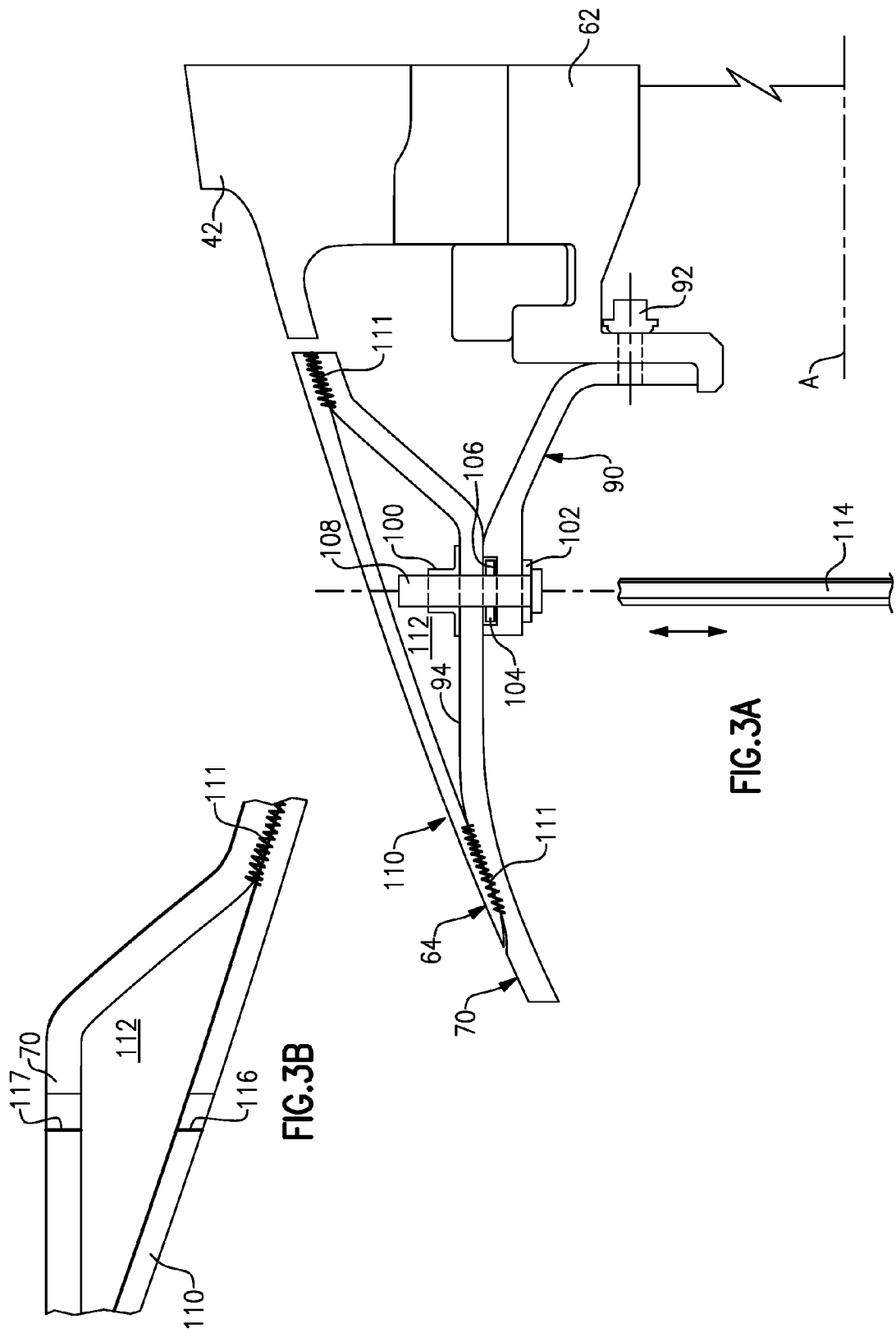

GAS TURBINE ENGINE NOSE CONE ATTACHMENT CONFIGURATION

BACKGROUND

This disclosure relates to a nose cone attachment configuration for a gas turbine engine.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large fan blades. A nose cone is positioned in front of the fan blades to provide an aerodynamic inner flow surface into the fan section. Typically, the nose cone is constructed from multiple components, including a spinner and a cover. The cover provides a convex portion at the inlet encloses an interior cavity of the spinner after the spinner has been secured to the fan hub. The heads of the fasteners used to secure the cap to the spinner are left exposed.

Typically, the spinner includes an integral rear flange that is secured to the fan hub. The complex geometry of the integral rear flange and spinner practically limits the types of materials that can be used for the spinner.

SUMMARY

In one exemplary embodiment, a gas turbine engine fan section includes a fan hub configured to rotate about an axis. A nose cone includes a spinner operatively mounted to the fan hub. The spinner supports a first fastening element and the nose cone includes an annular cover arranged over the fastening element. The spinner and annular cover provide an aerodynamic exterior surface of the nose cone without exposed fasteners. A second fastening element cooperates with the first fastening element to secure the spinner relative to the fan hub. The first and second fastening elements are oriented transversely to the axis.

In a further embodiment of any of the above, the nose cone includes a discrete bracket secured to the fan hub. The first and second fastening elements secure the spinner to the bracket.

In a further embodiment of any of the above, the spinner provides a convex surface the nose cone and the cover provides a curved frustoconical exterior surface.

In a further embodiment of any of the above, the cover is adhered to the spinner and provides an annular pocket between the spinner and the cover.

In a further embodiment of any of the above, the spinner is constructed from a composite material.

In a further embodiment of any of the above, the first fastening element is a nut and the second fastening element is a bolt.

In a further embodiment of any of the above, the nose cone includes an access hole opposite the second fastening element.

In another exemplary embodiment, a gas turbine engine fan section includes a fan hub configured to rotate about an axis. A nose cone is operatively mounted to the fan hub and supports a first fastening element. Access holes are arranged circumferentially about the nose cone and one of the access holes is arranged opposite the first fastening element. A second fastening element cooperates with the first fastening element to secure the spinner to the fan hub. The first and second fastening elements are oriented transversely to the axis.

In a further embodiment of any of the above, the nose cone includes a cover secured to the spinner and the spinner is secured to the fan hub.

In a further embodiment of any of the above, the gas turbine engine fan section includes a discrete bracket secured to the fan hub and the first and second fastening elements secure the spinner to the bracket.

In a further embodiment of any of the above, a pocket is provided between the cover and the spinner. The cover includes access holes in fluid communication with a deicing system.

In a further embodiment of any of the above, the access holes are 180° from the first and second fastening elements.

In a further embodiment of any of the above, the cover is adhered to the spinner.

In a further embodiment of any of the above, the spinner provides a convex surface and the cover provides a curved frustoconical exterior surface.

In another exemplary embodiment, a method of assembling a nose cone of a gas turbine engine includes the steps of providing a spinner having circumferentially arranged first fastening elements, securing an annular cover to the spinner over the first fastening elements to provide a unitary aerodynamic exterior surface of a nose cone with the spinner and the annular cover, inserting a tool through an access hole in the nose cone opposite the first fastening element, and attaching a second fastening element with the tool to the first fastening element.

In a further embodiment of any of the above, the spinner is constructed from a composite material and supports multiple circumferentially arranged nuts providing the first fastening elements.

In a further embodiment of any of the above, the securing step includes attaching the annular cover to the spinner with adhesive subsequent to the providing step.

In a further embodiment of any of the above, the access hole is 180° from the second fastening element and the second fastening element is oriented normal relative to a rotational axis of the spinner.

In a further embodiment of any of the above, the attaching step includes rotating a bolt threadingly into the first fastener.

In a further embodiment of any of the above, the method includes the step of attaching a bracket to a fan hub with fasteners generally parallel to the rotational axis of the fan hub prior to the securing step.

BRIEF DESCRIPTION OF THE DRAWINGS

The disclosure can be further understood by reference to the following detailed description when considered in connection with the accompanying drawings wherein:

FIG. 3A is an enlarged partial cross-sectional view through a portion of the nose cone and fan hub the area of a fastener.

FIG. 3B is an enlarged partial cross-sectional view through the nose cone in the area of an aperture that provides access to the fastener.

DETAILED DESCRIPTION

Figure 1:
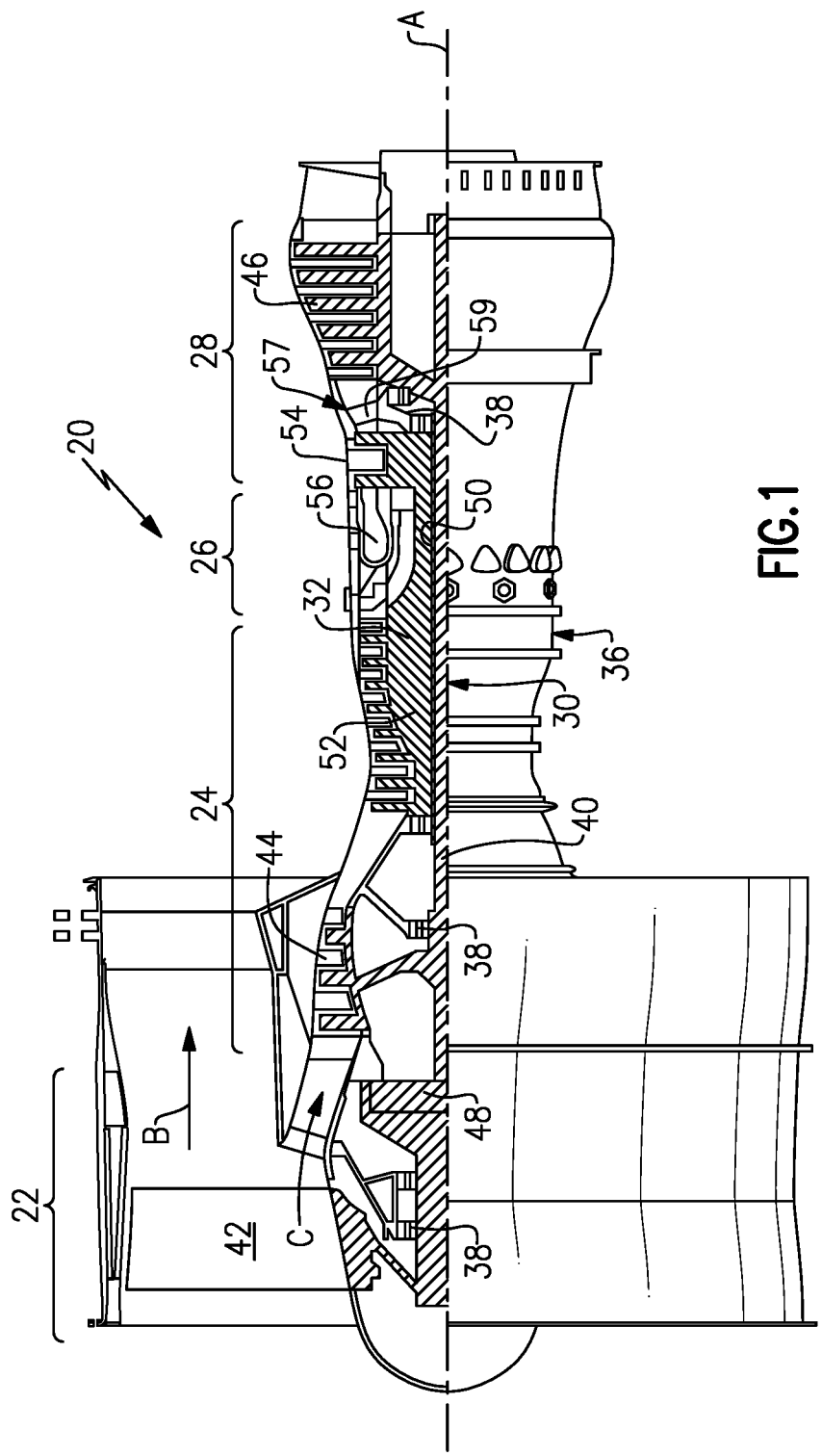
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram°R)/(518.7° R)]^{0.5}$. The "Low corrected fan tip speed", as disclosed herein according to one non-limiting embodiment, is less than about 1150 ft/second.

Figure 2A:
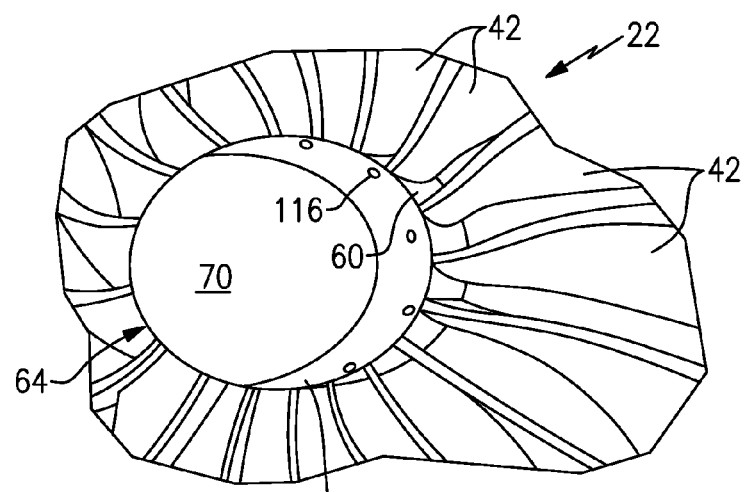
FIG. 2A is a perspective view of a portion of a fan section having fan blades and discrete platforms.
Figure 2B:
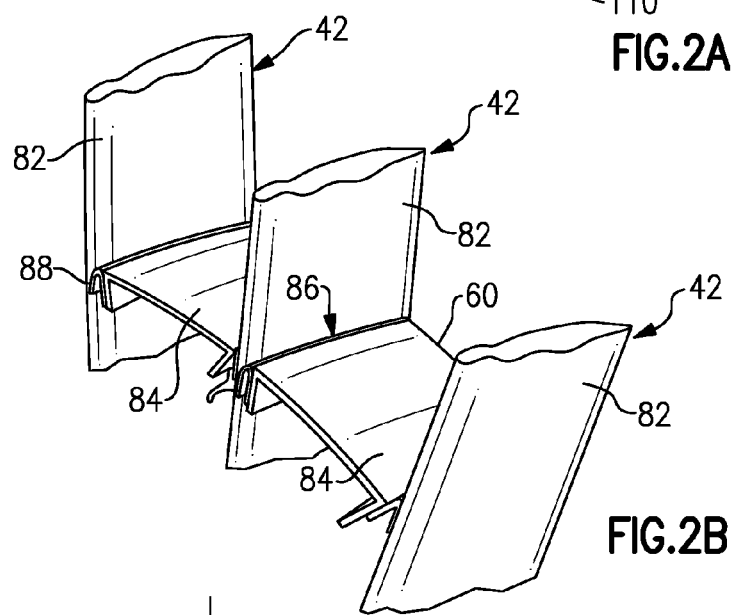
FIG. 2B is a schematic perspective view of the fan section with a nose cone removed.

The fan section 22 is shown in more detail in FIGS. 2A-2B. The fan section 22 includes multiple circumferentially arranged fan blades 42. Platforms 60, or spacers, are arranged between adjacent fan blades 42 and may be integral with or discrete from the fan blades 42. Referring to FIG. 3A, the fan blades 42 are mounted to a fan hub 62. In one example, the fan hub 62 is constructed from a titanium material.

Referring to FIG. 2B, each fan blade 42 has an airfoil 82. Each platform 60 has an outer surface 84, which together form a ring with the other platforms 60, spaced about axis A to provide an aerodynamic inner flow path surface. Though close fitting, a circumferential gap 86 exists between each platform outer surface 84 and an adjacent fan blade 42. Each gap 86 is blocked with a seal 88 to minimize a loss of airflow through the gas turbine engine 20.

Returning to FIG. 2A, a nose cone 64 is arranged forward of the fan blades 42 to provide an aerodynamic inner flow path through the fan section 22 along with the platforms 60. In the example shown, a unitary nose cone is used in which multiple components are not secured to one another with fasteners to provide the exterior aerodynamic surface of the nose cone. The nose cone 64 includes a spinner 70 that provides a convex exterior surface, in one example, at the inlet of the engine 20. The spinner 70 may be other shapes. However, the nose cone 64 need not use a cap at the inlet end of the nose cone, as is typical. An annular cover 110 is bonded to the spinner 70 to provide the remaining exterior surface of the nose cone 64. The spinner 70 and annular cover 110 may be constructed from composite material, such as carbon fiber and resin, for example.

Referring to FIG. 3A, the spinner 70 includes an annular recess 94 that accommodates a fastener used to secure the spinner 70 to the fan hub 62. In the example, a separate, discrete bracket 90 is secured to the fan hub 62 using fasteners 92, which are oriented parallel to the axis A in the example. The bracket 90, which may be annular, is constructed from a suitable material, for example, aluminum, titanium, nickel and/or alloys thereof. Thus, the bracket 90 is constructed from a different material than the spinner 70.

Multiple flange nuts 100 are arranged circumferentially about the annular recess 94 and secured to the spinner 70 to prevent rotation of the nut during assembly. The bracket 90 includes a recessed pocket 106 that receives an outer washer 104. An inner washer 102 is arranged beneath a head of a fastening element 108, such as a bolt. At least the outer washer 104 is a push-style washer that retains the fastening element 108 with respect to the bracket 90 during assembly.

An annular cover 110, which is a curved frustoconical shape in one example, is secured to the spinner 70 over the molded annular recess 94 to form an annular pocket 112. In one example, the cover 110 is secured to the spinner 70 by an adhesive 111 once the flange nuts 100 have been secured to the spinner 70. The annular cover 110 and spinner 70 together provide a unitary structure having an aerodynamic exterior surface of the nose cone 64 without fasteners in the flow path.

Figure 4:
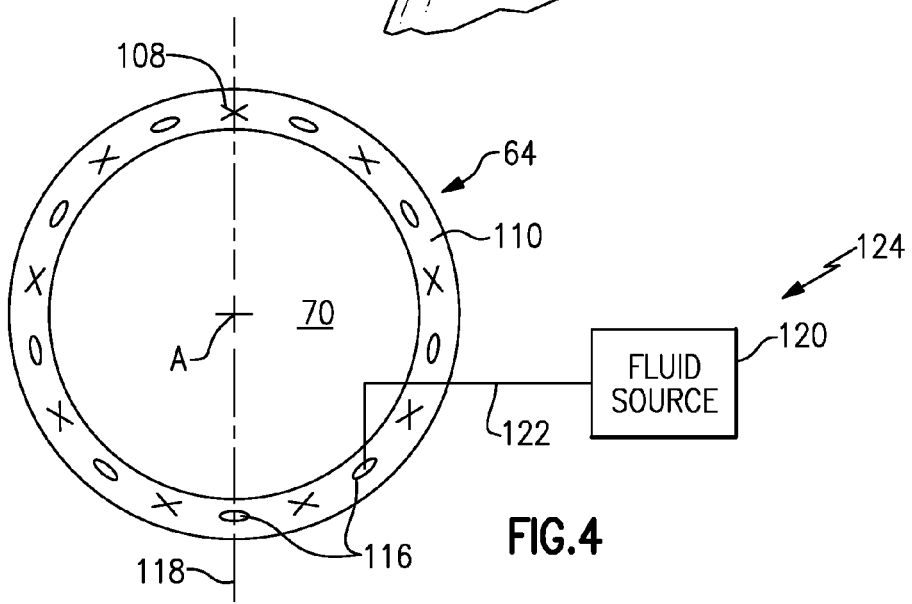
FIG. 4 is a schematic view of the nose cone illustrating locations of the access holes and fasteners as well as a deicing system.

Apertures, or access hole, 116, 117 are respectively provided in the cover 110 and spinner 70 to enable insertion of a low profile tool 114 into the nose cone 64 to enable the fastening element 108 to be tightened. In one example, the tool 114 can be a hexagonal drive, a torx drive or other similar low profile tool, which enables the size of the access holes 116, 117 to be kept to a minimum. The access hole for a given fastener is arranged on an opposite side to the fastener, for example 180°, as illustrated in FIG. 4. The tool access is indicated by the dashed line 118, which is normal to the axis A. In FIG. 4, the fasteners 108 are represented schematically by the "X" and the access holes are schematically represented by the ellipsis.

The access holes 116 are also utilized with a deicing system 124 to deice the nose cone 64. In one example, a fluid source 120 such as bleed air, is in fluid communication with the annular pocket 112 via a connection 122. In this manner, the access holes 116 also serve as fluid supply holes, which are present in some types of nose cone deicing systems.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine fan section comprising:
   a fan hub configured to rotate about an axis;
   a nose cone including a spinner operatively mounted to the fan hub, the spinner supporting a first fastening element, and the nose cone including a cover arranged over the first fastening element, and the nose cone includes circumferentially arranged access holes in an aerodynamic exterior surface of the nose cone, and at least one of the access holes arranged opposite of and aligned with a second fastening element;
   the second fastening element cooperating with the first fastening element to secure the spinner relative to the fan hub, the first and second fastening elements oriented transversely to the axis, multiple second fastening elements accessible through different access holes; and
   wherein the spinner and cover provide an aerodynamic exterior surface of the nose cone, and the first and second fastening elements do not provide a portion of the aerodynamic exterior surface.

2. The gas turbine engine fan section according to claim 1, wherein the nose cone includes a discrete bracket secured to the fan hub, the first and second fastening elements securing the spinner to the bracket.

3. The gas turbine engine fan section according to claim 1, wherein the spinner provides a convex surface the nose cone, and the cover provides a curved frustoconical exterior surface.

4. The gas turbine engine fan section according to claim 1, wherein the cover is adhered to the spinner and provides an annular pocket between the spinner and the cover.

5. The gas turbine engine fan section according to claim 1, wherein the spinner is constructed from a composite material.

6. The gas turbine engine fan section according to claim 1, wherein the first fastening element is a nut, and the second fastening element is a bolt.

7. The gas turbine engine fan section according to claim 6, wherein the access hole provides access to a head of the bolt.

8. A gas turbine engine fan section comprising:
   a fan hub configured to rotate about an axis;
   a nose cone including a spinner operatively mounted to the fan hub and supporting a first fastening element, access holes arranged circumferentially about the nose cone in an aerodynamic exterior surface of the nose cone, and at least one of the access holes arranged opposite of and aligned with the first fastening element;
   a deicing system in fluid communication with the access holes; and
   a second fastening element cooperating with the first fastening element to secure the spinner to the fan hub, the first and second fastening elements oriented transversely to the axis.

9. The gas turbine engine fan section according to claim 8, wherein the nose cone includes a cover secured to the spinner, and the spinner is secured to the fan hub.

10. The gas turbine engine fan section according to claim 9, comprising a discrete bracket secured to the fan hub, and the first and second fastening elements secure the spinner to the bracket.

11. The gas turbine engine fan section according to claim 9, wherein a pocket is provided between the cover and the spinner, the cover includes the access holes.

12. The gas turbine engine fan section according to claim 11, wherein the access holes are 180° from the first and second fastening elements.

13. The gas turbine engine fan section according to claim 9, wherein the cover is adhered to the spinner.

14. The gas turbine engine fan section according to claim 13, wherein the spinner provides a convex surface, and the cover provides a curved frustoconical exterior surface.

15. A method of assembling a nose cone of a gas turbine engine, comprising the steps of:
providing a spinner having circumferentially arranged first fastening elements provided in a recess on an exterior side of the spinner;
securing an annular cover to the spinner over the first fastening elements to enclose the recess and the first fastening elements to provide a unitary aerodynamic exterior surface of a nose cone with the spinner and the annular cover over the first fastening elements;
inserting a tool through an access hole in the nose cone opposite the first fastening element;
attaching a second fastening element with the tool to the first fastening element to operatively mount the spinner to a fan hub; and
leaving the access hole unobstructed for subsequent operation of the gas turbine engine.

16. The method according to claim 15, wherein the spinner is constructed from a composite material and supports multiple circumferentially arranged nuts providing the first fastening elements.

17. The method according to claim 15, wherein the securing step includes attaching the annular cover to the spinner with adhesive subsequent to the providing step.

18. The method according to claim 15, wherein the access hole is 180° from the second fastening element, and the second fastening element is oriented normal relative to a rotational axis of the spinner.

19. The method according to claim 15, wherein the attaching step includes rotating a bolt threadingly into the first fastener.

20. The method according to claim 15, comprising the step of attaching a bracket to the fan hub with third fasteners generally parallel to the rotational axis of the fan hub prior to the securing step.

* * * * *